(12) United States Patent
Daume

(10) Patent No.: US 7,338,130 B2
(45) Date of Patent: Mar. 4, 2008

(54) LOCKING HEADREST ASSEMBLY

(75) Inventor: Eric D. Daume, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 11/003,518

(22) Filed: Dec. 6, 2004

(65) Prior Publication Data
US 2006/0119159 A1 Jun. 8, 2006

(51) Int. Cl.
*B60R 22/28* (2006.01)
(52) U.S. Cl. .................. 297/410; 297/391
(58) Field of Classification Search ............ 297/410, 297/391
See application file for complete search history.

(56) References Cited

U.S. PATENT DOCUMENTS

| | | | | |
|---|---|---|---|---|
| 2,466,553 | A * | 4/1949 | McDonald | 297/410 |
| 3,498,672 | A * | 3/1970 | Leichtl | 297/410 |
| 3,563,603 | A * | 2/1971 | D'Aprile et al. | 297/410 |
| 4,111,483 | A * | 9/1978 | Jaeger | 297/410 |
| 4,527,834 | A | 7/1985 | Zyngier | |
| 4,568,123 | A * | 2/1986 | Yasui et al. | 297/410 |
| 4,647,756 | A * | 3/1987 | Willis | 219/243 |
| 4,671,573 | A | 6/1987 | Nemoto et al. | |
| 4,976,493 | A | 12/1990 | Frankila | |
| 5,052,754 | A * | 10/1991 | Chinomi | 297/408 |
| 5,156,440 | A | 10/1992 | Vidwans | |
| 5,615,928 | A * | 4/1997 | Penley | 297/452.56 |
| 5,713,635 | A * | 2/1998 | De Filippo | 297/410 |
| 5,860,703 | A * | 1/1999 | Courtois et al. | 297/410 |
| 5,895,094 | A | 4/1999 | Mori et al. | |
| 5,934,755 | A | 8/1999 | Halamish | |
| 6,062,645 | A * | 5/2000 | Russell | 297/410 |
| 6,099,077 | A * | 8/2000 | Isaacson | 297/410 |
| 6,543,852 | B2 | 4/2003 | Mori | |
| 6,631,956 | B2 | 10/2003 | Mauro et al. | |
| 6,655,742 | B1 * | 12/2003 | Ozaki | 297/410 |
| 6,761,409 | B2 * | 7/2004 | Ford | 297/410 |
| 6,802,565 | B2 * | 10/2004 | Isaacson | 297/410 |
| 6,874,854 | B2 * | 4/2005 | Terrand et al. | 297/410 |
| 7,255,401 | B2 * | 8/2007 | Yokoyama et al. | 297/410 |
| 2003/0222492 | A1 | 12/2003 | Nemoto et al. | |
| 2004/0145228 | A1 | 7/2004 | Terrand et al. | |
| 2005/0200185 | A1 | 9/2005 | Yokoyama et al. | |
| 2005/0280305 | A1 | 12/2005 | Gurtatowski et al. | |

* cited by examiner

*Primary Examiner*—David Dunn
*Assistant Examiner*—Erika Garrett
(74) *Attorney, Agent, or Firm*—Plumsea Law Group, LLC

(57) ABSTRACT

A system and method installing and removing a headrest from a seat is disclosed. The system and method include provisions for installing a headrest to a seat without the use of tools and for preventing the removal of the headrest during normal operation. The system and method can also include provisions for removing the headrest by operating an internal locking device.

24 Claims, 8 Drawing Sheets

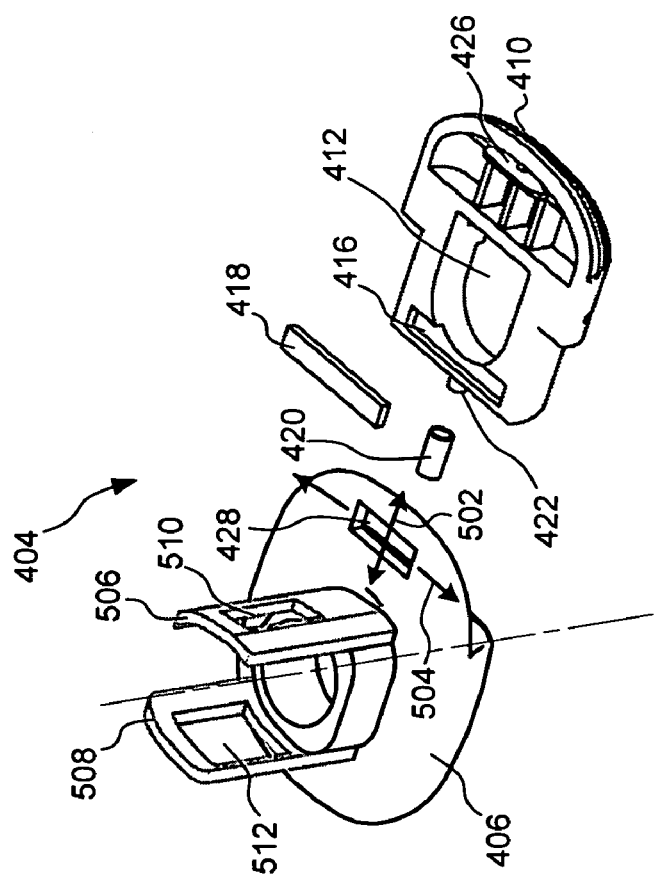
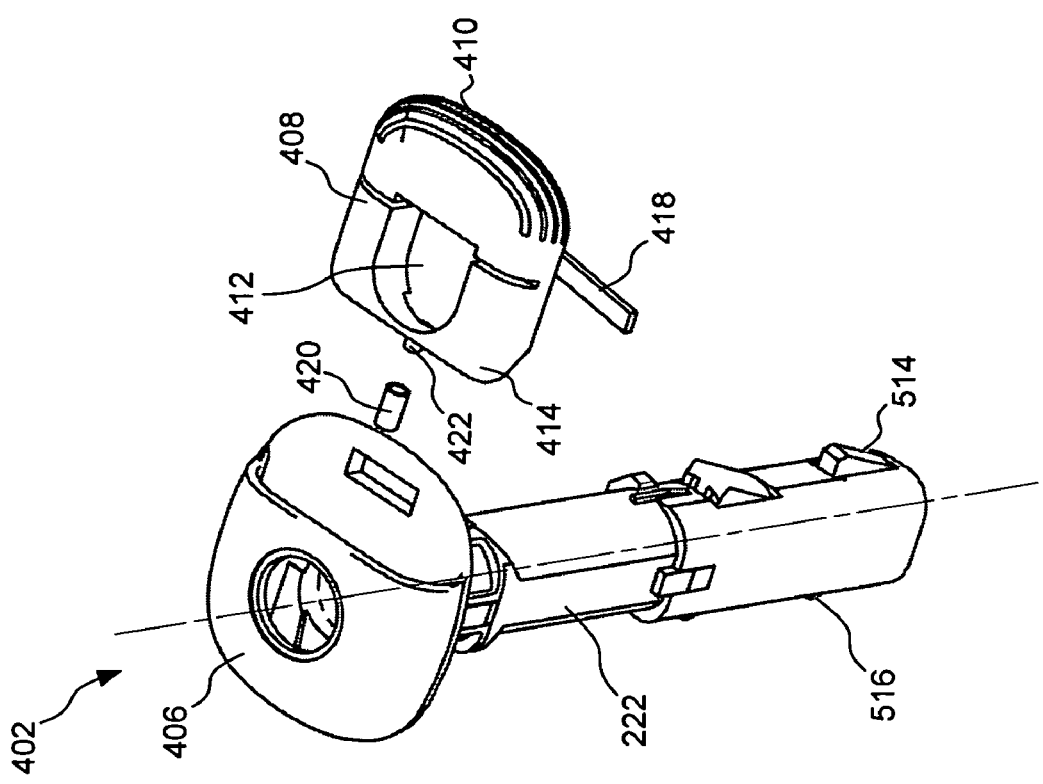
Figure 5
Figure 4

LOCKING HEADREST ASSEMBLY

BACKGROUND OF THE INVENTION

1. Field of the Invention

This invention relates to the field of seats, and more particularly, to a seat for use in a motor vehicle that includes a headrest assembly.

2. Related Art

Motor vehicle seats generally include headrests. These headrests are designed to provide support to a driver or passenger's head and can reduce injuries in the event of a collision. In some cases, headrests are height adjustable and can be moved to various distances away from a backrest. The height of the headrest can be adjusted to provide support to an occupant's head and to restrain the motion of the occupant's head during a collision.

Current headrests are easily removed. If an occupant operates a motor vehicle with the headrests removed, serious injury to the occupant can occur.

There is currently a need for a system that prevents the removal of a headrest by an occupant. There is also a need for a headrest system that can be removed by a service technician so that the headrest can be repaired or replaced.

SUMMARY OF THE INVENTION

A locking headrest assembly is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention includes a seat comprising: a lower portion; a backrest connected to the lower portion; a headrest connected to the backrest, the headrest having an installed position and a detached position; where the headrest is associated with the backrest in the installed position and where the headrest is separated from the backrest in the detached position. The invention also includes a lock that prevents the headrest from moving the installed position to the detached position.

In another aspect, the lock is located within an outer surface of the backrest.

In another aspect, the invention includes an adjustment lock disposed outward of an outer surface of the backrest.

In another aspect, the outer surface of the backrest can be displaced.

In another aspect, the headrest includes a vertical member and wherein a locking bar configured to engage the vertical member.

In another aspect, the lock is spring biased and includes a portion configured to contact a finger.

In another aspect, provisions assist in properly orienting a second lock with a first lock. These provisions can assist in properly orienting a second lock in terms of both its axial position and its circumferential position with respect to a first lock.

In another aspect, the invention provides a method for removing a headrest assembly from a seat comprising the steps of: displacing a portion of an outer surface of the seat to gain access to a portion of the seat located within the outer surface of the seat; operating a locking member, located within the outer surface of the seat, associating the headrest assembly with the seat; and removing the headrest assembly from the seat.

In another aspect, the displacing step includes a step of moving a rear member.

In another aspect, the step of moving a rear member includes the step of removing the rear member.

In another aspect, the displacing step includes the step of opening a seam.

In another aspect, the step of operating a locking member includes the step of moving a knob cartridge against a spring bias.

In another aspect, the invention provides a method of associating and disassociating a headrest assembly with a seat comprising the steps of: associating the headrest assembly with the seat by moving a notch associated with the headrest assembly beyond an internal locking member, the internal locking member preventing removal of the headrest; disassociating the headrest assembly from the seat by displacing an outer surface of the seat; operating the internal locking member located within the outer surface of the seat; and removing the headrest assembly from the seat.

In another aspect, the step of operating a locking member includes the step of moving a knob cartridge against a spring bias.

In another aspect, the step of operating a locking member includes the step of moving a locking bar away from a vertical member.

In another aspect, the step of operating a locking member includes the step of moving a locking bar away from a notch.

In another aspect, the step of disassociating the headrest assembly from the seat includes the step of moving the headrest away from the seat to engage the internal locking member.

In another aspect, the step of displacing an outer surface of the seat includes the step of removing a backboard.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 4 is an exploded isometric diagram of a top view of a preferred embodiment of a first lock.

FIG. 5 is an exploded isometric diagram of a preferred embodiment of a second lock.

DETAILED DESCRIPTION OF THE PREFERRED EMBODIMENT(S)

Figure 1:
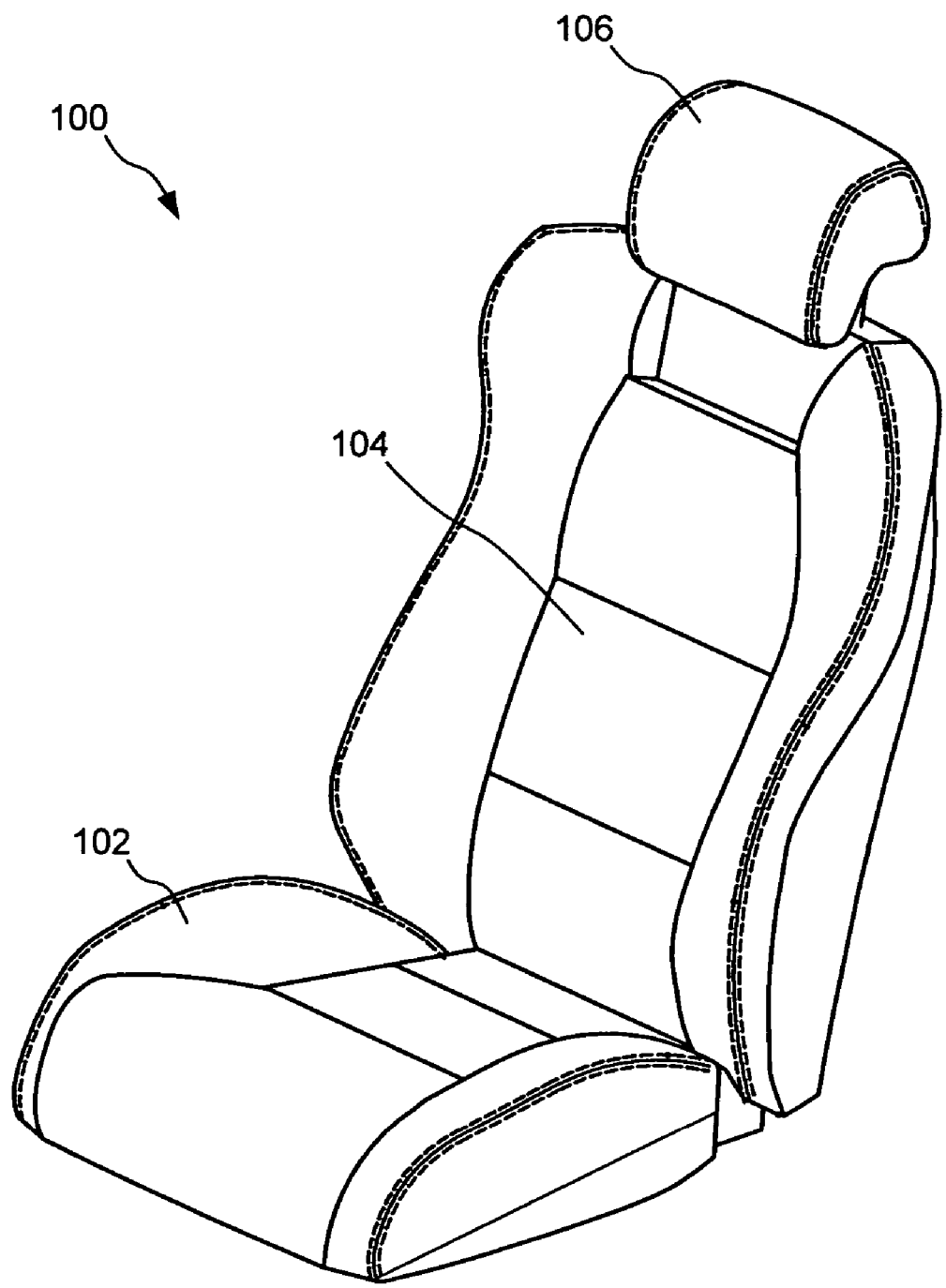
FIG. 1 is a schematic diagram of a preferred embodiment of a seat.

FIG. 1 is an isometric view of a preferred embodiment of a seat 100. Seat 100 includes a lower portion 102 and a backrest 104. Backrest 104 is connected to lower portion 102. Headrest 106 is connected to backrest 104, and in some embodiments, headrest 106 can move with respect to backrest 104.

Figure 2:
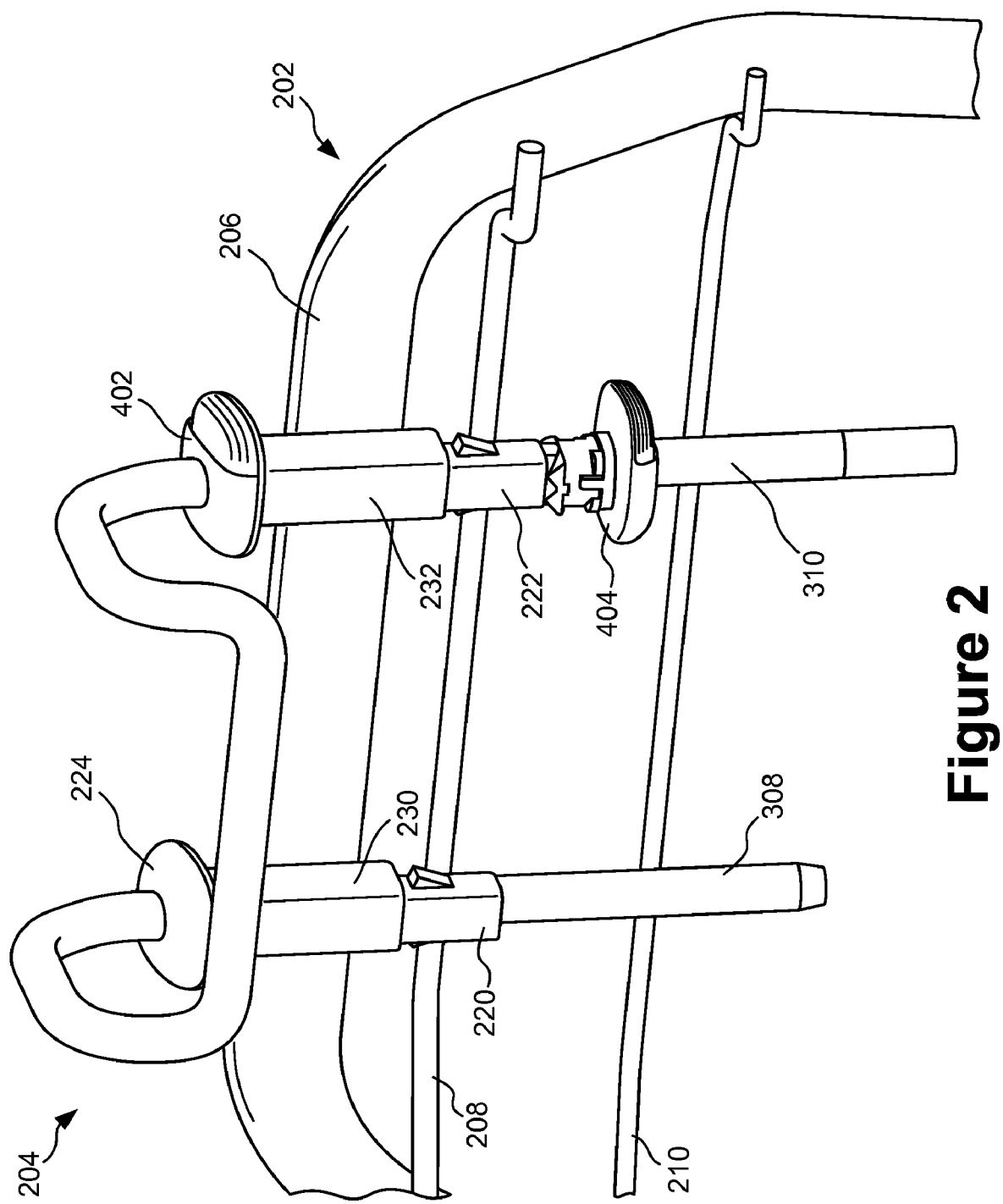
FIG. 2 is a schematic diagram of a preferred embodiment of a backrest frame and a headrest frame.
Figure 10:
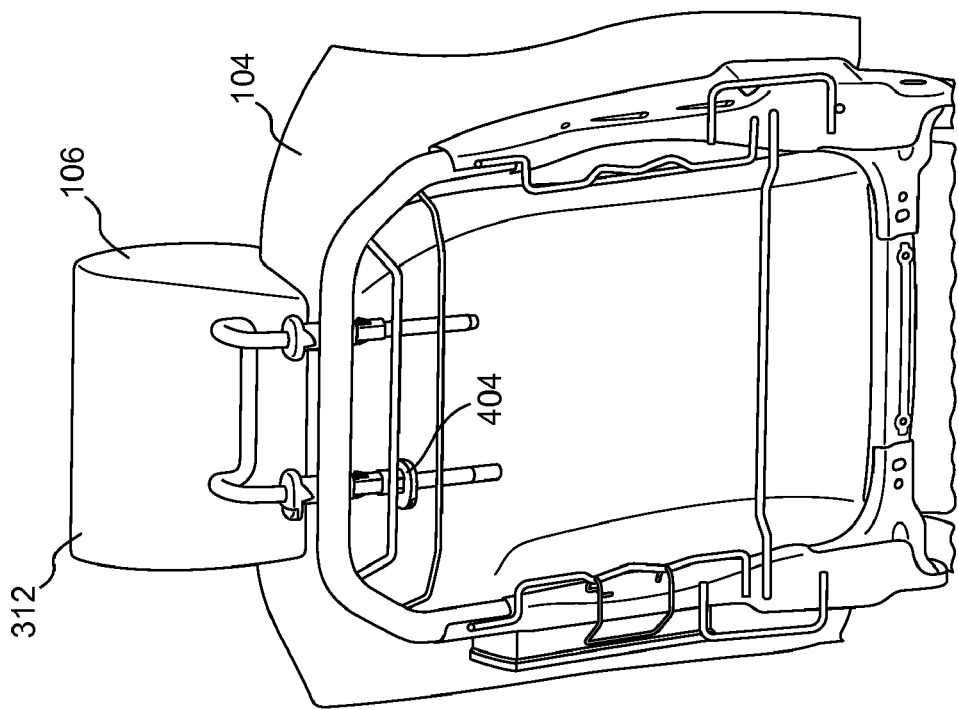
FIG. 10 is a schematic diagram of a rear view of a preferred embodiment of the interior of a seat.
Figure 9:
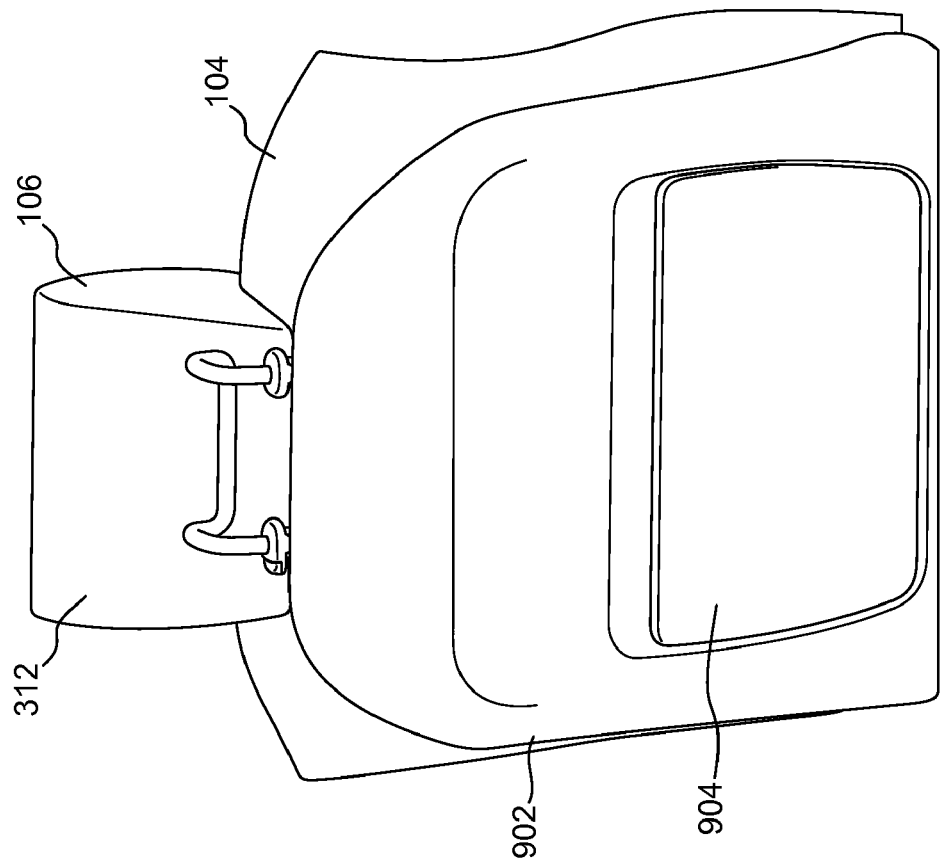
FIG. 9 is a schematic diagram of a rear view of a preferred embodiment of a seat.

FIG. 2 is an exposed isometric view of seat 100. As shown in FIG. 2, seat 100 includes a backrest frame 202. Backrest frame 202 establishes a structural foundation for backrest 104 and other components can be attached to backrest frame 202. One of these components is headrest 106. Headrest 106 preferably includes headrest frame 202 supporting an upholstered portion 312 (see FIGS. 9 and 10). In the embodiment shown in FIG. 2, headrest frame 204 can preferably move with respect to backrest frame 202.

Backrest frame 202 can include one or more cross bars to increase the structural integrity of backrest 104 and to provide a backing or foundation for upholstery. Backrest frame 202 can include an upper cross bar 206, first cross bar 208 and second cross bar 210. Backrest frame 202 can include additional cross bars as well.

Headrest frame 204 is preferably associated with backrest frame 202. In a preferred embodiment shown in FIG. 2, headrest frame 204 is associated with upper cross bar 206 of backrest frame 202. There are many different ways headrest frame 204 can be associated with upper cross bar 206, however, a preferred arrangement is shown in FIG. 2. Preferably, first sleeve 230 and second sleeve 232 are attached to cross bar 206. In a preferred embodiment, first and second sleeves 230 and 232 are welded to cross bar 206. After first sleeve 230 is attached to cross bar 206, first guide 220 is then attached to first sleeve 230. In a preferred embodiment, first guide 220 is snapped into first sleeve 230. Likewise, after second sleeve 232 has been attached to cross bar 206, second guide 222 is attached to second sleeve 232. In a preferred embodiment, first guide 220 is snapped into first sleeve 230.

First guide 220 is configured to receive first vertical member 308 and second guide 222 is configured to receive second vertical member 310. Second guide 222 preferably includes a first lock 402 and a second lock 404, which can both engage a vertical member, in the embodiment shown in FIGS. 2-7, both locks engage second vertical member 310.

Headrest frame 204 is designed to provide structural support to headrest upholstery 312. To accomplish this, headrest frame 204 preferably includes a forward portion 302 that extends towards the occupant's head. First lateral portion 304 and second lateral portion 306 help to extend forward portion 302 towards the occupant's head. First lateral portion 304 is connected to first vertical member 308 and second lateral portion 306 is connected to second vertical member 310. First and second vertical members 308 and 310, respectively, are designed to engage backrest 104. In some embodiments, one of the vertical members is extended to accommodate a notch second lock. In the embodiment shown in the Figures, second vertical member 310 has been extended.

In the embodiment shown in FIGS. 2 to 7, first lock 402 and second lock 404 engage the same vertical member, second vertical member 310. However, in other embodiments, first lock 402 can engage a different vertical member than second lock 404.

FIGS. 4 to 7 show a preferred embodiment of first lock 402 and second lock 404. First lock 402 includes a lock housing 406 that can be attached to second guide 222. Lock housing 406 is designed to receive knob cartridge 408. Knob cartridge 408 includes a touch portion 410 that is designed to be depressed by a finger or thumb. Knob cartridge 408 includes a hole 412 that accommodates a second vertical member 310 of headrest frame 204 (see FIG. 2). Knob cartridge 408 includes an interior portion 414 that is disposed opposite touch portion 410 and is preferably disposed on the opposite side of hole 412 as touch portion 410.

Interior portion 414 preferably includes a recess 416 that is designed to receive locking bar 418. Preferably, recess 416 is designed so that a portion of locking bar 418 protrudes into hole 412 when locking bar 418 is properly placed in recess 416.

Interior portion 414 also includes provisions to receive a spring 420. In the embodiment shown in FIGS. 4-6, a post 422 is used to retain spring 420. One end of spring 420 is received by post 422 and abuts knob cartridge 408 while the other end of spring 420 is urged against back wall 424 of lock housing 406.

Knob cartridge 408 can also include a tab 426 extending towards lock housing 406. A slot 428 can be provided in lock housing 406. When assembled, tab 426 moves within slot 428 and slot 428 restrains the motion of tab 426. Preferably, slot 428 allows tab 426 to move in a first direction 502 (generally left to right as shown in FIGS. 4 and 5), but prevents motion in a second direction 504. With this arrangement, knob cartridge 408 is constrained to move a relatively short distance in a single direction 502 and is biased by spring 420 away from back wall 424 of lock housing 406. Locking bar 418 is, in turn, biased toward second vertical member 310.

Vertical member 310 can include one or more notches. In a preferred embodiment, vertical member 310 includes a plurality of notches. In the exemplary embodiment shown in FIG. 6, vertical member 310 includes three notches, a first notch 602, a second notch 604 and a third notch 606. Because these notches are used to adjust the distance between headrest 106 and backrest 104 (see FIG. 1), this set of notches can be referred to as adjustment notches.

Figure 6:
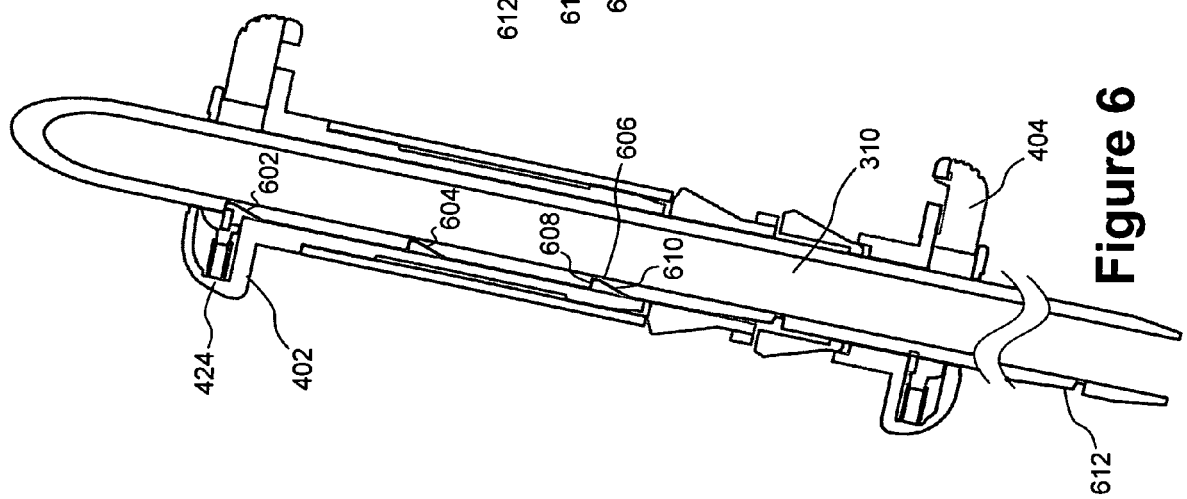
FIG. 6 is a cross sectional diagram of a preferred embodiment of a headrest assembly and a first lock and a second lock.

Preferably, each of the notches shares a similar configuration. In the embodiment shown in FIG. 6, notches 602, 604 and 606 have a shoulder 608 disposed above a slope 610. This configuration allows second vertical member 310 to be moved freely away from backrest 104 (upwards as shown in FIG. 6). However, after locking bar 418 engages one of the adjustment notches, the locking bar 418 must be cleared from the engaged adjustment notch to permit vertical member 310 to move towards backrest 104 (downwards as shown in FIG. 6).

Figure 12:
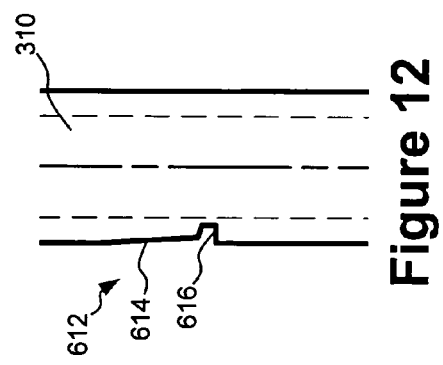
FIG. 12 is an enlarged schematic diagram of a preferred embodiment a retaining notch.

Preferably, second vertical member 310 includes a retaining notch 612. Retaining notch 612 is preferably configured to interact with second lock 404 and is designed differently than the adjustment notches. Referring to FIGS. 6 and 12, which is an enlarged view of retaining notch 612, retaining notch 612 includes a sloped portion 614 disposed above a shoulder portion 616. This arrangement allows second vertical member 310 to be moved towards backrest 104 (downwards in FIG. 6) so that retaining notch 612 moves past second lock 404 and further inward into backrest 104.

In some embodiments, this movement of notch 612 past second lock 404 in the inward direction, can be accomplished by simply pressing headrest 104 inwards towards backrest 106. In other words, headrest 104 can be installed into backrest 106 without the use of tools. In some other embodiments, retaining notch 612 is designed so that second lock 404 catches second vertical member 310 as it is being inserted into backrest 104. After second lock 404 catches notch 612, second lock must be disengaged to permit further insertion of second vertical member 310 into backrest 104.

Regardless of the particular installation arrangement, retaining notch 612 can prevent the removal of headrest 106. As second vertical member 310 is being moved away from backrest 104 (upwards in FIGS. 6 and 12), second lock 404 engages the shoulder portion 616 of retaining notch 612. In the preferred embodiment, locking bar 418 (see FIG. 4) is biased towards retaining notch 612 and locking bar 418 engages retaining notch 612. Because shoulder portion 616 includes a shoulder facing inward (downwards in FIGS. 6 and 12), second lock 404 prevents the removal of headrest 106 unless second lock 404 is disengaged.

Some embodiments include provisions to assist in properly orienting second lock 404 with first lock 402. In some embodiments, these provisions assist in properly orienting second lock 404 in terms of both its axial position—its distance from first lock 402—and its circumferential position, its angular orientation with respect to first lock 402. In the preferred embodiment shown in FIGS. 4 and 5, one or more snap-fit connectors are used to accomplish this orientation.

Referring to FIGS. 4 and 5, lock housing 406 includes first flange 506 and second flange 508. Although these flanges 506 and 508 can be any shape, they are preferably, arcuate as shown in FIG. 5. First flange 506 includes first snap-in retainer 510 and second flange 508 includes second snap-in retainer 512. First snap-in retainer 510 corresponds to first snap-in projection 514 disposed on a lower portion of second guide 222. Likewise, second snap-in retainer 512 corresponds to second snap-in projection 516, which is also disposed on a lower portion of second guide 222. In the preferred embodiment shown in FIGS. 4 and 5, first snap-in retainer 510 has a different size than second snap-in retainer 512. Because first snap-in projection 514 corresponds to first snap-in retainer 510 and second snap-in projection 516 corresponds to second snap-in retainer 512, the two snap-in projections 514 and 516 are also of different sizes. These mismatched sizes insure that lock housing 406 can only be attached to second guide 222 in a single predetermined angular orientation at a predetermined height or distance from first lock 402.

First lock 402 and second lock 404 can be similar or different. In some embodiments, first lock 402 is a different kind of device than second lock 404. In other embodiments, first lock 402 is similar to second lock 404, and in still other embodiments, first lock is similar to second lock 404, but is oriented differently. In the preferred embodiment shown in FIG. 6, first lock 402 is similar to second lock 404, but is oriented differently than second lock 404. Preferably, second lock 404 is structurally similar to first lock 402 but is disposed upside down with respect to first lock 402.

Figure 8:
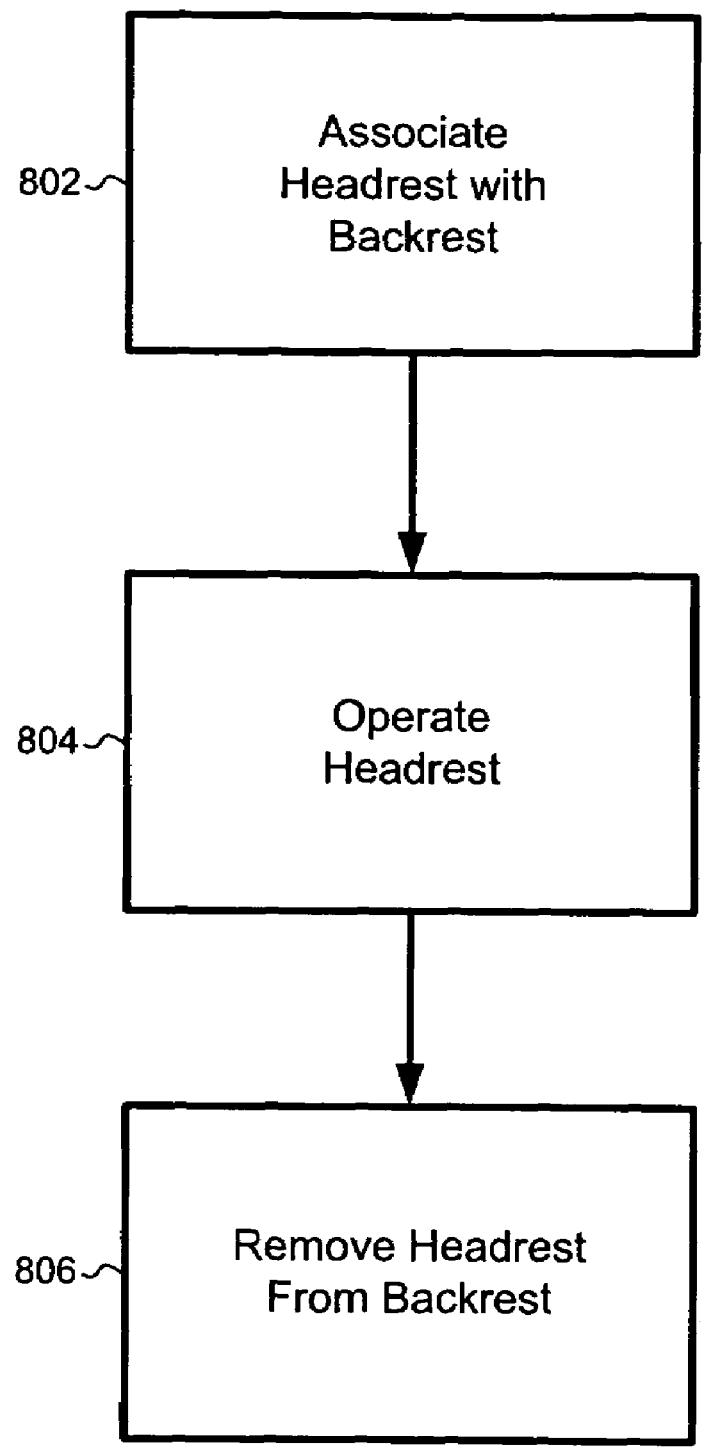
FIG. 8 is a flow diagram of a preferred embodiment of a method for associating, operating and removing a headrest assembly.

FIG. 8 is a flow diagram of a preferred embodiment of a method for associating, operating and removing headrest 106. In the embodiment shown in FIG. 8, the process starts with step 802, where headrest 106 is associated with backrest 104. Preferably, headrest 106 is associated with backrest 104 by engaging a lock disposed on an interior portion of backrest 104 with headrest 106. The interior portion is a portion of backrest 104 that is disposed inward of the outer surface of backrest 104. In a preferred embodiment, second lock 404 serves as this internal lock. Preferably, no tools are used during this installation step and headrest 106

After installation, headrest 106 is operated in step 804. During operation, headrest 106 can move relative to backrest 104. As headrest 106 moves with respect to backrest 104, one of the adjustment notches eventually engages first lock 402. First lock 402 and the corresponding adjustment notches are designed to hold headrest 106 in a desired position. Due to the force of gravity, headrest 106 tends to move towards backrest 104. The adjustment notches in cooperation with first lock 402 are designed to permit headrest 106 to move away from backrest 104, but prevent the motion of headrest 106 towards backrest 104 unless first lock 402 is actuated.

Figure 3:
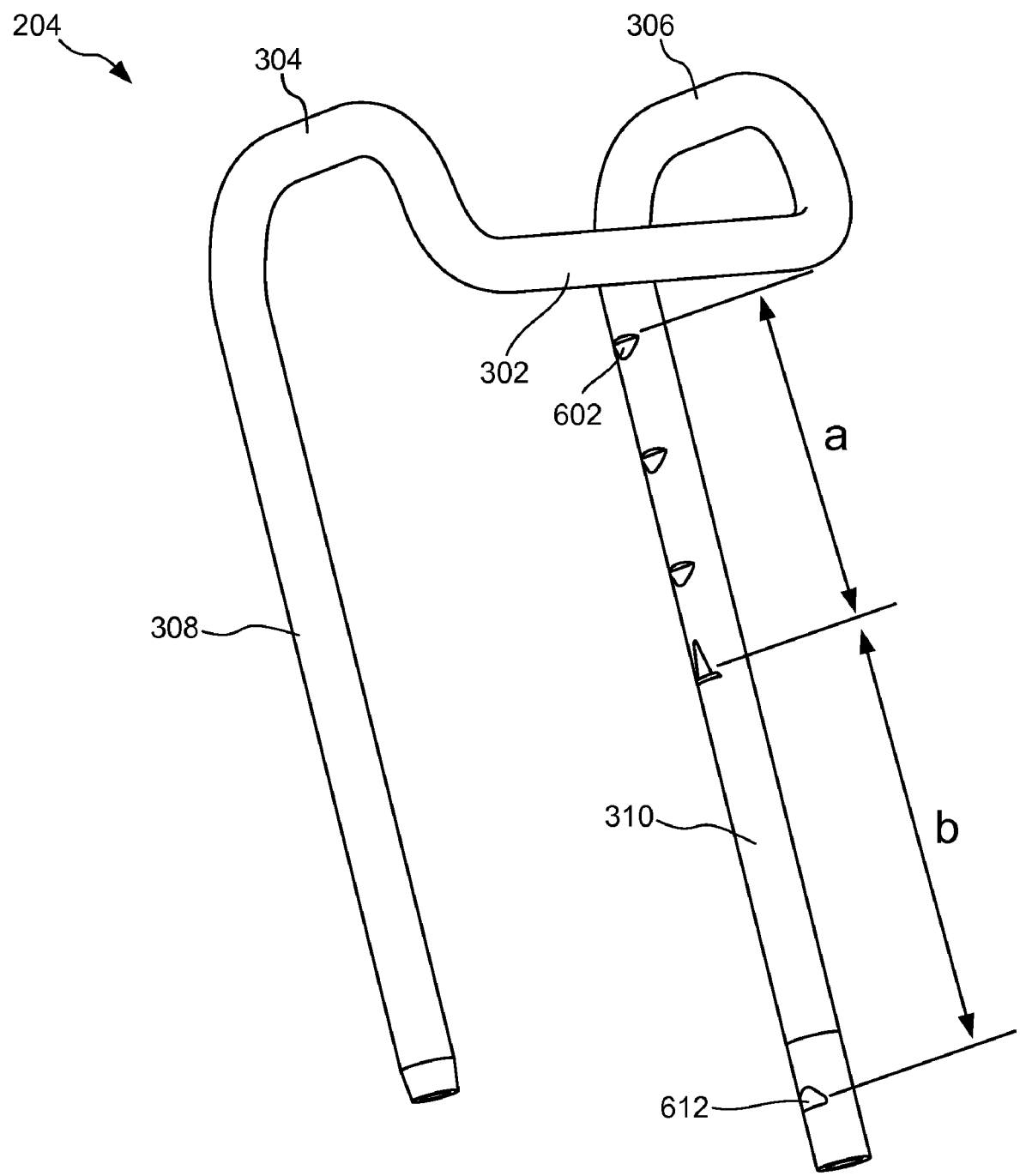
FIG. 3 is a schematic diagram of a preferred embodiment of headrest frame.
Figure 7:
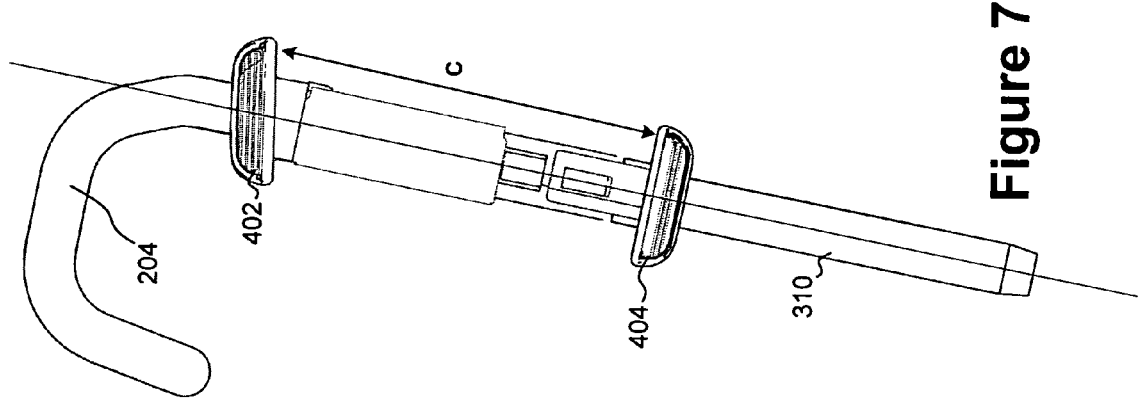
FIG. 7 is a side view of a preferred embodiment of a headrest assembly and a first lock and a second lock.

Properly selecting the spacing between retaining notch 612 to the adjustment notches and the spacing between first lock 402 and second lock 404, permits headrest 106 to operate without the intervention of second lock 404. Referring to FIGS. 3 and 7, distance a represents the general operating range of headrest 106. Distance b represents the distance from the lowest adjustment notch 606 to retaining notch 612. Distance c represents the distance between first lock 402 and second lock 404. Preferably, the distances are selected so that distance c is less than distance b but greater than distance a. The relationships between these three distances can be expressed by the following inequality:

$$a < c < b$$

In step 806, headrest 106 is removed from backrest 104. Preferably, a lock or device prevents the removal of headrest 106 from backrest 104 by a user during normal operation. However, there are some instances where it is desirable to remove headrest 106 from backrest 104. In some cases, for example where headrest 106 has become damaged or discolored, provisions are provided that allows the removal of headrest 106 from backrest 104.

Preferably, a lock disposed within the outer surface of backrest 104 participates in the removal of headrest 106. To access this interior lock, the outer surface of backrest 104 or a portion of the outer surface of backrest 104 is preferably displaced.

There are many different ways to displace the outer surface of backrest 104. In one embodiment, shown in FIGS. 9 and 10, backrest 104 includes rear member 902. Rear member 902 covers the rear portion of backrest 104. In some embodiments, rear member 902 includes an integral storage pocket 904. Rear member 902 can be made of a generally rigid material, a semi-rigid material or a flexible material. In those embodiments where rear member 902 is rigid or semi-rigid, rear member can be referred to as a backboard.

Rear member 902 can form a portion of the outer surface of backrest 104. In those embodiments that include rear member 902, removal, displacement or shifting of rear member 902 can serve as a displacement of the outer surface of backrest 104. In the embodiment shown in FIG. 10, rear member 902 has been removed to provide access to the interior of backrest 104. In other embodiments, rear member 902 can be displaced, for example, pivoted, or shifted. Once rear member 902 has been moved, technicians can gain access to the interior portion of backrest 104. From here, technicians can operate second lock 404 to release headrest 106 from backrest 104. After second lock 404 has been operated, headrest 106 can be removed from backrest 104.

Figure 11:
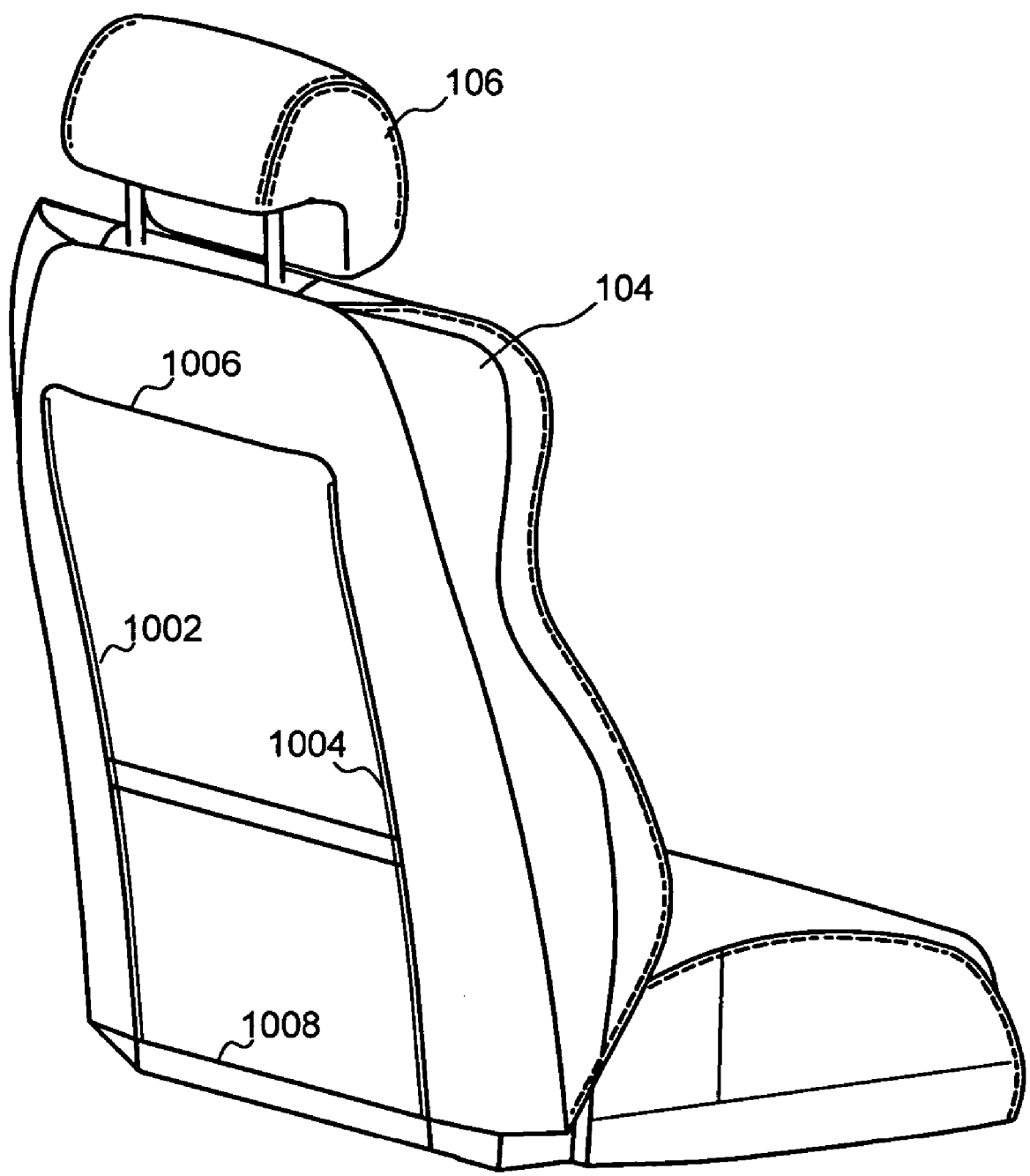
FIG. 11 is a schematic diagram of a rear view of a preferred embodiment a seat.

FIG. 11 shows another embodiment of backrest 104. In this embodiment, one or more seams are used to provide access to the interior portion of backrest 104. In this embodiment, one or more seams are disposed on a rear portion of backrest 104. First seam 1002 is disposed vertically on a first side of the rear portion of backrest 104. Second seam 1004 is disposed vertically on a second side of the rear portion of backrest 104. Third seam 1006 is disposed horizontally on an upper portion of the rear portion of backrest 104. Finally, fourth seam 1008 is disposed on a lower portion of the rear portion of backrest 104. In some embodiments, one of these seams is provided. In other embodiments, two or more of these seams can be provided. And in some embodiments, all of the seams can be provided.

The seams 1002, 1004, 1006 and/or 1008 can use any fastener. Some of the fasteners that can be used include: zippers, buttons, snaps and magnetic catches. Hook and loop fasteners, sometimes referred to by the trademark Velcro, can also be used.

In those embodiments where two or more seams are used, the seams can be continuous or discontinuous. Consider an example where an embodiment provides first seam 1002 and fourth seam 1008, and a zipper is selected as the fastener. The fastener could be continuous or discontinuous. This means that a continuous faster would provide a zipper that ran continuously from first seam 1002 to fourth seam 1008. In this embodiment, the zipper would have a generally L-shape and would include a turn where first seam 1002 meets fourth seam 1008. In embodiments where the fastener is discontinuous, a first zipper would be provided for first seam 1002 and a second zipper would be provided for fourth seam 1008. These principles of continuous or discontinuous fasteners can be applied to any embodiment, regardless of which seams where selected and which fasteners were selected.

In these embodiments where one or more seams are provided, operating a fastener associated with the seam and moving material associated with the seam can constitute a displacement of the outer surface of backrest 104. After the seam has been opened, technicians can gain access to the interior portion of backrest 104 and operate second lock 404 (see FIG. 9) to remove headrest 106 from backrest 104.

Using the principles and teachings disclosed above, the removal of a headrest by users can be prevented and the removal of a headrest by service technicians can be facilitated.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A seat comprising:
a lower portion;
a backrest connected to the lower portion;
a headrest assembly connected to the backrest, the headrest assembly having an installed position and a detached position;
the headrest assembly comprising a headrest frame;
wherein the headrest frame is associated with the backrest in the installed position;
wherein the headrest frame is separated from the backrest in the detached position;
wherein a lock prevents the headrest frame from moving from the installed position to the detached position,
wherein the lock is spring-biased and includes a finger-operated portion; and
wherein the lock is located within the backrest and the headrest frame is separated from the backrest by displacing a removably attachable portion of an outer surface of the backrest and operating the lock to allow removal of the headrest frame from the backrest.

2. The seat according to claim 1, wherein the lock is accessed by displacing a rear cover of the backrest.

3. The seat according to claim 1, further comprising an adjustment lock disposed outward of an outer surface of the backrest.

4. The seat according to claim 3, wherein the adjustment lock is substantially similar to the lock.

5. The seat according to claim 1, wherein the headrest frame includes a vertical member and wherein a locking bar is configured to engage the vertical member.

6. The seat according to claim 1, wherein the removably attachable portion comprises at least one of a zipper, a button, a snap, a magnetic catch, or a hook-and-loop fastener.

7. The seat according to claim 1, wherein the lock includes a lock housing including a first snap-in retainer and a second snap-in retainer.

8. The seat according to claim 7, wherein the first snap-in retainer is sized differently than the second snap-in retainer.

9. The seat according to claim 7, wherein a guide associated with a vertical member includes a first snap-in projection corresponding to the first snap-in retainer and a second snap-in projection corresponding to the second snap-in retainer.

10. A method for removing a headrest assembly from a seat comprising the steps of:
displacing a portion of an outer surface of the seat to gain access to a portion of the seat located within the outer surface of the seat;
operating a locking member located within the outer surface of the seat and associating the headrest assembly with the seat to release the headrest from the seat, wherein the locking member is spring-biased and finger-operable; and
removing the headrest assembly from the seat.

11. The method according to claim 10, wherein the displacing step includes a step of moving a rear member.

12. The method according to claim 11, wherein the step of moving a rear member includes the step of removing the rear member.

13. The method according to claim 10, wherein the displacing step includes the step of opening a seam.

14. The method according to claim 10, wherein the step of operating a locking member includes the step of moving a knob cartridge against a spring bias.

15. A method of associating and disassociating a headrest assembly with a seat comprising the steps of:
associating the headrest assembly with the seat by moving a notch associated with the headrest assembly beyond an internal locking member, the internal locking member preventing removal of the headrest;

disassociating the headrest assembly from the seat by displacing an outer surface of the seat;

operating the internal locking member located within the outer surface of the seat to release the headrest from the seat; and removing the headrest assembly from the seat.

16. The method according to claim 15, wherein the step of operating a locking member includes the step of moving a knob cartridge against a spring bias.

17. The method according to claim 15, wherein the step of operating a locking member includes the step of moving a locking bar away from a vertical member.

18. The method according to claim 15, wherein the step of operating a locking member includes the step of moving a locking bar away from a notch.

19. The method according to claim 15, wherein the step of disassociating the headrest assembly from the seat includes the step of moving the headrest away from the seat to engage the internal locking member.

20. The method according to claim 15, wherein the step of displacing an outer surface of the seat includes the step of removing a backboard.

21. A seat comprising:
a lower portion;
a backrest connected to the lower portion;
a headrest assembly connected to the backrest, the headrest assembly having an installed position and a detached position;
the headrest assembly comprising a headrest frame and a forward portion configured to support an occupant's head;
an adjustment lock disposed on an outer surface of the backrest to enable adjustment of a distance between the forward portion and the backrest; and
a removal lock disposed within the backrest to restrict removal of the theadrest frame from the backrest,
wherein the adjustment lock and the removal lock are substantially similar; and wherein the headrest frame is separated from the backrest by displacing a removably attachable portion of an outer surface of the backrest and operating the removable lock to allow removal of the headrest frame from the backrest.

22. The seat of claim 21, wherein the removal lock is accessible by displacing a portion of the outer surface of the backrest.

23. The seat of claim 21, wherein the adjustment lock and the removal lock are oriented differently.

24. The seat of claim 23, wherein the adjustment lock and the removal lock are placed on or within the seat in inverted positions with respect to each other.

* * * * *